Feb. 25, 1930.　　　F. J. OVEN　　　1,748,582
GASKET
Filed July 1, 1927
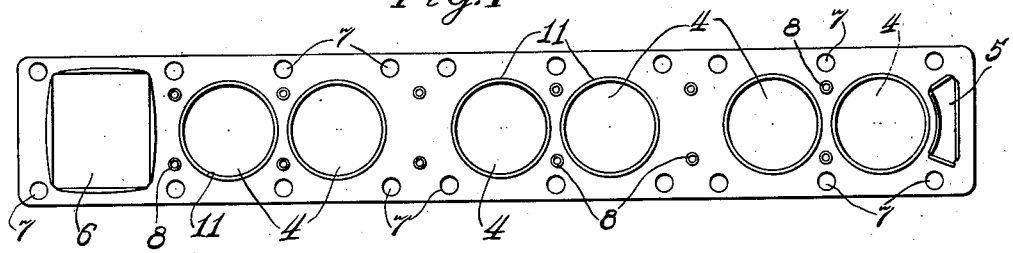
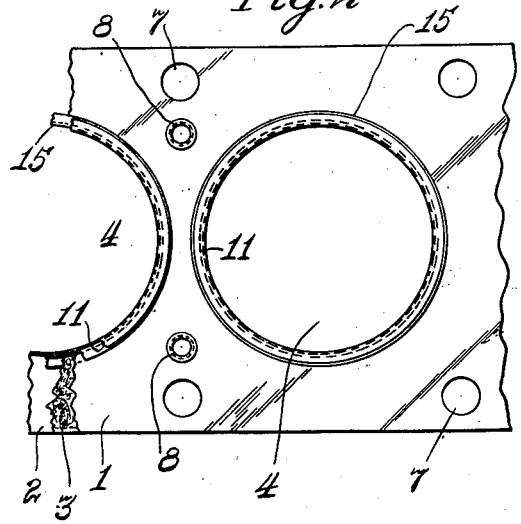
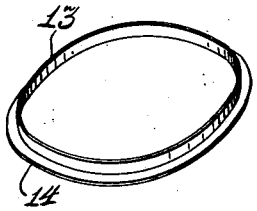
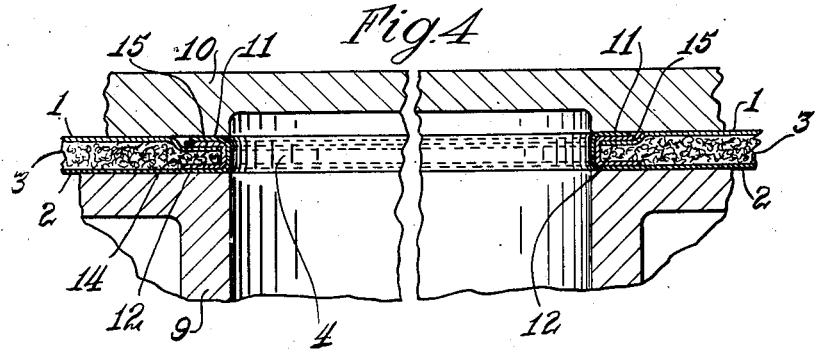
Inventor
Frank J. Oven
by Daniel J. Brennan
Attorney.

Patented Feb. 25, 1930

1,748,582

UNITED STATES PATENT OFFICE

FRANK J. OVEN, OF CHICAGO, ILLINOIS, ASSIGNOR TO VICTOR MANUFACTURING & GASKET COMPANY, OF CHICAGO, ILLINOIS, A CORPORATION OF ILLINOIS

GASKET

Application filed July 1, 1927. Serial No. 202,871.

This invention relates to improvements in gaskets.

It is an object of the invention to reinforce gaskets around and adjacent the openings provided in the same.

Another object of the invention is to utilize gasket reinforcing means for holding portions of metallic layers of the gasket in the desired position.

It is also an object of the invention to provide a gasket which is composed of two thin metallic layers and an intermediate layer of refractory material with reinforcing elements which facilitate the manufacture of and improves the gasket.

It is another object of the invention to provide a gasket with reinforcing stiffening elements which are particularly adapted to resist high temperatures and to thereby protect those portions of the gasket, which in the normal use of the gasket are destroyed prematurely.

With these and numerous other objects in view an embodiment of the invention is illustrated in the accompanying drawing and is described in the following specification in which:

Figure 1 is a top plan view of an assembled gasket of this type.

Figure 2 is a fragmentary top plan view with parts broken away and shown on a larger scale.

Figure 3 shows perspectively one of the reinforcing elements prior to its insertion into the gasket.

Figure 4 is a sectional view through a gasket and elements for which it serves as a packing.

As in other gaskets, in the present application, the gasket is composed of two metallic layers 1, 2 as for instance sheet copper, between which is inserted a layer 3 of refractory material as for instance a layer of asbestos or some similar substance, permitting the gasket to yield under compression and at the same time being adapted to resist the high temperature to which it is exposed.

The gasket as illustrated in Figure 1 is intended for use in connection with a six cylinder gas engine in which the cylinders are disposed in a straight line and for this purpose it is provided with circular aligned openings 4 and is also provided with openings 5 and 6 for permitting the passage of a cooling fluid or the like. A plurality of bolt holes 7 are marginally arranged in the gasket, and the sheet material 1, 2, and 3 preferably is held in proper assembled relation by fastening means 8 which in the embodiment illustrated are shown as eyelets riveted over on both surfaces of the gasket.

The aligned openings 4 as will be seen from Figure 4 have about the same diameter as the bores of the cylinders 9 between which and the head 10 the gasket is interposed. Owing to the heat of the gases the material of which the gasket is made frequently is attacked along the circumferential edges of the cylinder openings 4 and for the purpose of increasing the resistance of the gasket against the action of the hot gases a reinforcing or stiffening element 15 is inserted along the margin of these openings between the outer layers of the gasket.

The two layers 1 and 2 ordinarily are held in assembled relation along the margin of the various openings 4 by having a flange 11 of one of these metal foils bent over the margin 12 of the other metal foil, the margin 12 for this purpose being slightly depressed so as not to substantially increase the thickness of the assembled gasket adjacent the marginal portion of the openings. While heretofore it has been proposed to reinforce a gasket adjacent this margin by placing a copper wire of circular or other cross section about the opening, it has been found that such mechanical reinforcements are not entirely sufficient to always withstand the same high temperatures which act upon the gaskets at this point as the reinforcement herein disclosed. In order to enhance the resistance against these high temperatures and at the same time permit the gaskets to be assembled in the ordinary way by flattening a flange of one sheet against the margin of another sheet, the reinforcing ring element (Fig. 3) of the present invention is formed of sheet metal of suitable thickness and of a material such as steel which has a much higher resistance against high temperatures than copper.

This reinforcing element comprises a sheet steel ring formed as indicated in Figure 3 to angular cross section having a substantially vertical cylindrical flange 13 from the base of which a horizontal flange 14 projects. Upon assembling this reinforcing element with the other parts of the gasket the upper portion of the vertical cylindrical flange 13 is pressed over and into substantially horizontal engagement with the marginal depressed portion 12 of one layer of the sheet 1 and is held in this depressed position by the overlapping flange 11 of the lower metal layer 2, as illustrated in Figure 4.

It will be seen that in this way the entire reinforcing element is protected by a sheet metal layer, which may be of copper or the like, and that even upon partial destruction of the portion of this sheet 2 forming openings 4, the gases still are prevented from attacking the edge of the margin 12 of the upper layer and also from coming into contact with the edge of the interposed layer of refractory material 3, since the steel ring protects these edge portions. It will be seen, furthermore, that owing to the deformation of the reinforcing element from angular cross section into U-shaped cross section, as shown in Figure 4, that the bent over flange 15 of this reinforcing element is securely clamped between the two flat ring portions 11 and 12 of the copper metal sheets 1 and 2, of which the gasket is composed and that notwithstanding this insertion of the steel reinforcing element between the copper sheets, the total thickness of the gasket at this point is not increased over the thickness of the parts of the gasket remote from the edges of the openings 4.

Although copper inserts may have been used heretofore as reinforcing elements for gaskets of this type, they when attacked by heat would begin to melt at 1900° F. while the melting point of a steel reinforcing element is about 2900° F. Therefore the steel reinforces and eliminates the danger of premature destruction and provides a stiffer element. It is also to be noted that the reinforcing element made of steel is considerably less expensive than reinforcing elements made of copper and that owing to this arrangement the cost of the entire gasket is reduced.

I claim:

1. A gasket having an opening consisting of layers of sheet metal and interposed non-metallic material, including a sheet steel ring having flanges in engagement with the sheet metal layers, one of said layers being bent over said sheet steel ring to cover the outer surface of the same.

2. A gasket having layers of sheet metal and a non-metallic material between the same provided with an opening, including a sheet metal ring of U-shaped cross section surrounding said opening, two horizontal legs of the U-shaped ring being in engagement with the sheet metal layers and the intermediate portion being covered by a bent portion of one of said layers.

3. A gasket comprising two outer metallic layers, non-metallic material interposed between said layers, the margin of one of said layers being bent along one edge into overlapping relation with the adjacent margin of the other layer to hold the parts in assembled relation, and a reinforcing strip embracing the edge of said non-metallic material and clamped in position between the overlapped parts of said layers.

4. A gasket comprising two outer metallic layers disposed in overlapped relation, non-metallic material between said layers, a reinforcing member embracing one margin of one of said layers and said material, and a margin of the other of said layers embracing said member.

5. A gasket comprising two outer metallic layers, a compressible filler between said layers, a margin of one of said layers being bent to overlap the other of said layers, and a member having a U-shaped cross-section lining the interior of said margin, said member embracing said filler and having one leg clamped between said margin and said other layer.

6. A gasket consisting of layers of sheet metal and interposed non-metallic material and each having an opening, one of said layers having a wall extending through said opening, and a sheet metal reinforcing element between and secured to said sheet metal layers adjacent the edge of the opening and next to said wall, each of said layers being disposed in overlapped relation to each other and to the reinforcing element.

7. A gasket having an opening and comprising two sheet metal layers, a layer of non-metallic material interposed between said layers, one of said layers having its marginal portion bent to enclose the edge of said non-metallic material about said opening and to overlie the marginal portion of the other layer, and a reinforcing element enclosing the edge of said non-metallic material about said opening, a marginal portion of said reinforcing element being enclosed between the overlying portions of said layers.

In testimony whereof I affix my signature at 10 South La Salle Street, Chicago, Illinois.

FRANK J. OVEN.